United States Patent [19]
York et al.

[11] Patent Number: 6,087,155
[45] Date of Patent: Jul. 11, 2000

[54] ON SITE MICROBIAL BIOREMEDIATION SYSTEM AND METHOD OF USING SAID SYSTEM

[76] Inventors: Billy G. York, 2319 Park Cir., San Antonio, Tex. 78259; Jack A. Mayer, 2627 Crow Valley, San Antonio, Tex. 78232; Joe A. Andrews, Jr., 8920 Fair Oaks Pkwy., Boerne, Tex. 78006; Arthur G. Cleveland, 1028 Country Pl., Fortson, Ga. 31808

[21] Appl. No.: 09/006,994

[22] Filed: Jan. 14, 1998

Related U.S. Application Data

[60] Provisional application No. 60/035,566, Jan. 15, 1997.

[51] Int. Cl.[7] ............................... B09B 3/00; C02F 3/00; C12M 3/00; C12N 1/00
[52] U.S. Cl. .................. 435/262.5; 210/601; 435/243; 435/287.1; 435/289.1; 435/309.2; 435/802; 435/821
[58] Field of Search ................ 435/243, 262.5, 435/287, 288, 287.1, 289.1, 309.2; 210/601

[56] References Cited

U.S. PATENT DOCUMENTS

| | | | |
|---|---|---|---|
| 4,432,869 | 2/1984 | Groeneweg et al. | 210/602 |
| 4,774,187 | 9/1988 | Lehmann | 435/313 |
| 4,906,577 | 3/1990 | Armstrong et al. | 435/313 |
| 4,994,391 | 2/1991 | Hoffman | 435/286 |
| 5,081,036 | 1/1992 | Familletti | 435/286 |
| 5,118,626 | 6/1992 | Hashimoto et al. | 435/289 |
| 5,151,362 | 9/1992 | Kawaguchi et al. | 435/240.25 |
| 5,155,034 | 10/1992 | Wolf et al. | 435/240.24 |
| 5,171,687 | 12/1992 | Moller et al. | 435/286 |
| 5,443,985 | 8/1995 | Lu et al. | 435/240.25 |
| 5,628,364 | 5/1997 | Trenz | 166/53 |
| 5,756,304 | 5/1998 | Jovanovich | 735/34 |
| 5,811,255 | 9/1998 | Hunter et al. | 735/29 |

FOREIGN PATENT DOCUMENTS

WO 97/32818  9/1997  WIPO ............................. C02F 3/00

OTHER PUBLICATIONS

Gray, R.E. "The Solution to Pollution", a brochure of S.W.S. Inc., approx. date of publication—1991.

"Member Opportunity Exchange" in The Oxford Club Newsletter, Apr. 1995.

"Microbial Bioremediation", a brochure of Munitech, Inc., approx. date of publication—1995.

*Primary Examiner*—David M. Naff
*Assistant Examiner*—Deborah Ware
*Attorney, Agent, or Firm*—Jayme A. Huleatt

[57] ABSTRACT

An on site bioremediation system that delivers logarithmically growing, active microorganisms from the culture vessel directly to the biodegradable waste to be metabolized is disclosed. The system includes a controller, culture vessel and separate containers of stock microorganisms and nutrient medium. The periodic or continuous addition of stock microorganisms and fresh nutrient media is controlled by a computer. After a particular cell density is reached, the active, logarithmically growing microorganisms flow out of the system to the waste site on a periodic or continuous basis.

20 Claims, 5 Drawing Sheets

ON SITE MICROBIAL BIOREMEDIATION SYSTEM AND METHOD OF USING SAID SYSTEM

This application claims priority to provisional application Serial No. 60/035,566 filed on Jan. 15, 1997, which is incorporated in its entirety by reference.

BACKGROUND OF THE INVENTION

Applicants' invention relates to an on site bioremediation system, and methods of using the on site system to degrade biodegradable waste. More specifically, the present invention relates to an on site bioremediation system for preparing active, logarithmically growing microorganisms and delivering these logarithmically growing microorganisms directly to the biodegradable waste. There is a need in the field of bioremediation to deliver logarithmically actively growing microorganisms directly to the site of the waste rather than delivering dormant microorganisms that have been stored in containers as is generally how bioremediation is performed in the field.

Bacterial culturing systems are known that produce bacteria on site, for example, at a waste treatment plant. However, these systems use elaborate culturing systems, such as using portioned chambers or two different chambers to prepare microorganisms for delivery to a waste. Additionally, it has been shown in some systems that it is necessary to acclimate the microorganisms to the environment or substrate into which it is to be released prior to delivery to the site. The present system requires none of these complicated systems.

One particular system disclosed in U.S. Pat. No. 4,994,391, is utilized to produce active bacteria to breakdown chemical or biological wastes in waste water effluents. This system utilizes a combination of a unique culturing basin and an acclimator basin in a temperature controlled space. The culturing basin contains numerous components, such as a series of removable nutrient suspension means and a vertical collection pipe with holes. The bacteria are cultured in the presence of the nutrient suspension means as bacteria are pumped out of one or two of these culturing basins into the acclimator basin. No additional microorganisms are added to the culture system after the initial inoculation. Additionally, the nutrients are contained inside the vessel in a series of cups.

U.S. Pat. No. 5,171,687 discloses an apparatus for continuously injecting bacteria into a flow system, such as a drain leading into a grease trap. The apparatus is composed of a two chamber system. The first or inner chamber is the culturing chamber and contains the bacteria in the form of a cake or gel in a basket. Water, oxygen, and nutrients are provided to the first chamber. The bacteria within the first chamber reach a level at which time they overflow into the second chamber that is nutrient free. From the second chamber, the bacteria containing liquid flows into the drain to be treated by the bacteria. It is believed that the dual chamber arrangement enhances production and activity of the bacterial enzymes.

The bioremediation system of the present invention is a simple system that does not require any of these elaborate systems to deliver active, logarithmically growing microorganisms to a site to be treated. The present system is highly versatile and is capable of preparing a variety of microorganisms, such as bacteria and fungi, to treat different types of waste, by customizing the parameters. This system is useful for continuously culturing any microorganism that is capable of metabolizing a biodegradable waste. No other system presently provides such a simple system for producing live, active, and multiplying microorganisms at the site to be treated. Other bioremediation systems generally utilize microorganisms that have been cultured, harvested, and stored in containers ("containerized" or shelf" microbial cultures) until use at the site of the waste to be degraded. These prior art methods utilize these dormant microbial cultures resulting in the survival of no more than approximately 15% of the administered population of microorganisms introduced into the waste.

The present system obviates the manual application of expensive "shelf" commercial cultures by delivering active, logarithmically growing microorganisms directly into the biodegradable waste. The present system can be readily up-sized or down-sized as needed to meet the waste treatment requirements. Smaller or larger culture vessels can be used, the vessels can be connected to each other and used in series, or several individual vessels can be used at the same site, depending upon the number of actively growing microorganisms that are needed to metabolize the waste.

Additionally, the present system is very simple so that it can be easily set up by one person in a few hours. It can also be easily relocated by one person. The system only requires a clear water supply and an electric power source to operate. Thus, the bioremediation system of the present invention fills a need in the bioremediation field for a simple, on site functional system that delivers active, logarithmically growing microorganisms directly into the waste site.

SUMMARY OF TITLE INVENTION

It is an object of the present invention to provide an on site bioremediation system capable of providing active, logarithmically growing microorganisms to a biodegradable waste.

Another object of the present invention is to provide a method of using the on site bioremediation system to deliver active, logarithmically growing microorganisms directly to a biodegradable waste.

To achieve the above objectives, there is provided an on site bioremediation system comprising a culture vessel including water input means, microorganism input means, nutrient input means, and culture vessel output means; at least one container of nutrient media located external to the culture vessel and connected to the nutrient input means; at least one container of stock microorganisms located external to the culture vessel and connected to the microorganism input means; and a controller comprising a computer programmed to control the operation of the bioremediation system.

There is also provided a method of using this on site bioremediation system to prepare active, logarithmically growing microorganisms at the site of the biodegradable waste by culturing microorganisms under conditions sufficient to obtain active, logarithmically growing microorganisms in the on site bioremediation system as described above. The nutrient media and stock microorganisms held in containers external to the culture vessel are added to the culture vessel periodically or continuously during culturing in the culture vessel until a sufficient number of active, logarithmically growing microorganisms to metabolize the biodegradable waste are obtained in the culture vessel. Then these active, logarithmically growing microorganisms are applied to the biodegradable waste to metabolize the waste.

It is believed that the success of continued use of the present on site bioremediation system can be attributed to the continuous addition of new "stock" or originally selected microorganisms into the culture vessel along with fresh nutrient media. This step provides an advantage of obtaining microbial cultures that survive in high numbers and actively metabolize the waste at the site. Further, by the continuous addition of the stock microorganism to the culture vessel, mutations to the culture of microorganisms that could have resulted in changed properties can be minimized. Such mutations could result in a microbial culture that is no longer able to metabolize the waste it was originally selected to metabolize. However, by periodically or continuously adding the original stock microorganisms, the culture continues to have an influx of microorganisms with characteristics responsible for metabolizing the waste.

The present system is a versatile system that can be tailored to treat a specific waste by simply selecting the appropriate microorganism that metabolizes that waste using methods of selection well known to skilled microbiologists.

The above and further objects details and advantages of the present invention will become apparent from the following detailed description of preferred embodiments read in combination with the accompanying drawings.

DETAILED DISCLOSURE OF THE INVENTION

Figure 1:
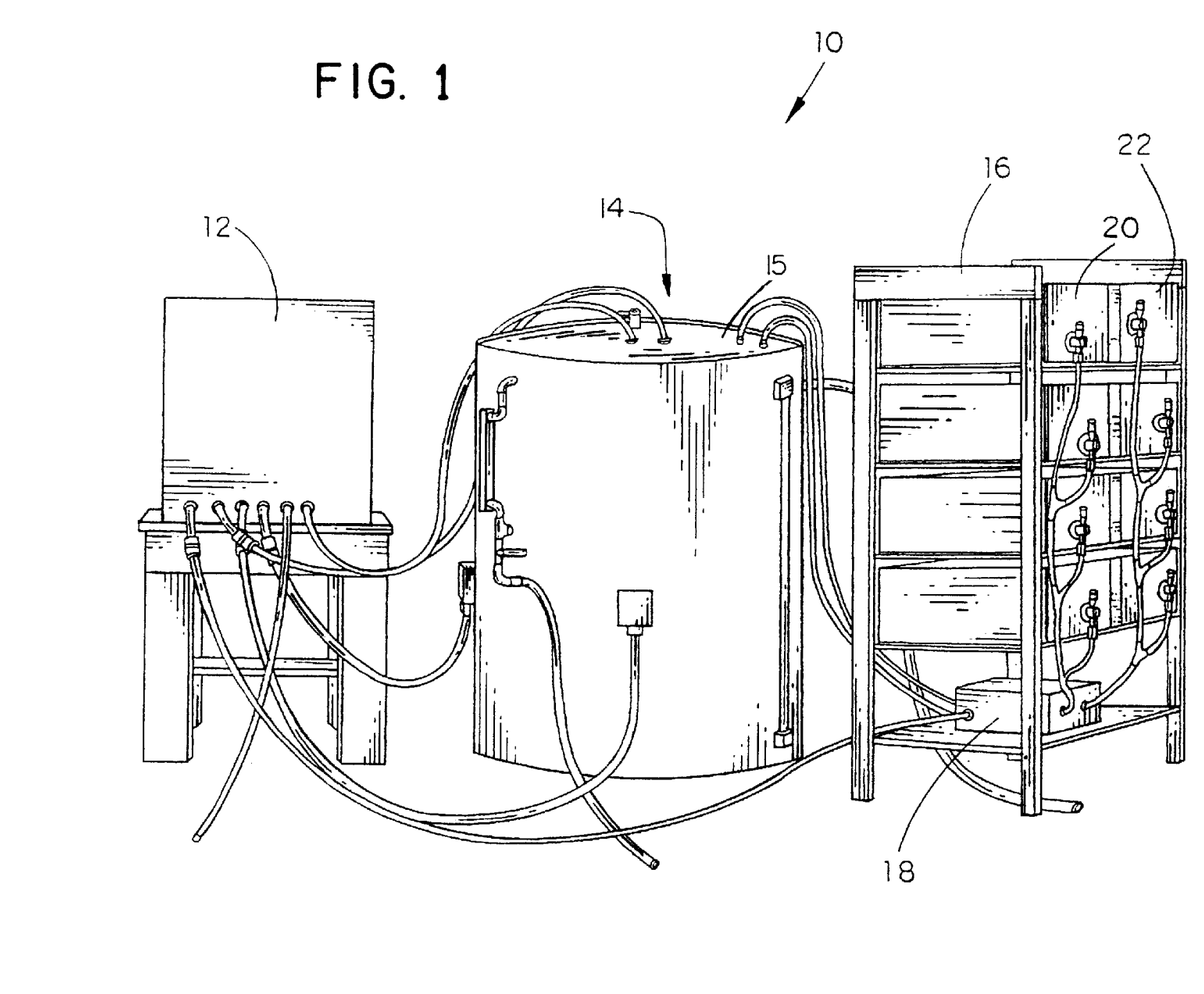
FIG. 1 shows a perspective view of the bioremediation system of the present invention.

FIGS. 1 to 5 disclose the present bioremediation system in detail. Specifically, the bioremediation system (10) of the present invention is shown in FIG. 1 and is composed of three major components: a controller (12); a culture vessel (14); and a rack (16) that holds a plurality of nutrient containing boxes (20), a plurality of microorganism containing boxes (22), and a nutrient/microorganism pump (18).

Figure 2A:
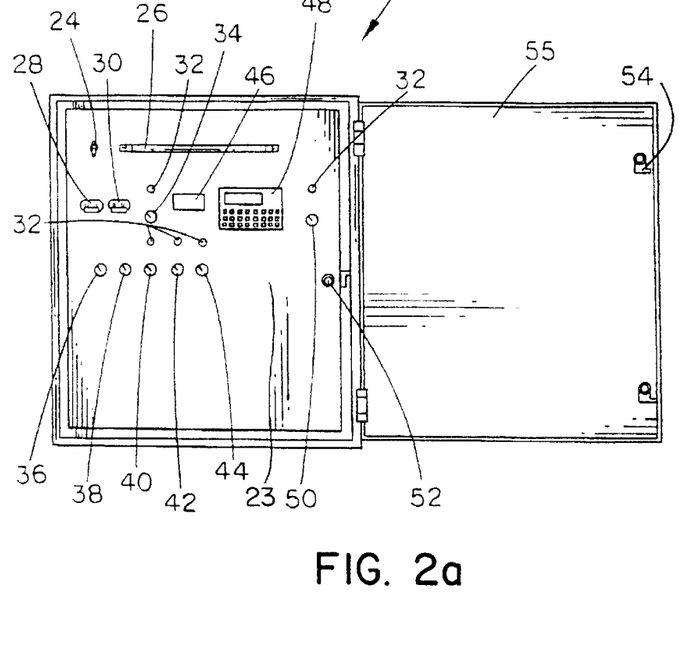
FIG. 2a shows a front view of the controller of the bioremediation system of the present invention.
Figure 2B:
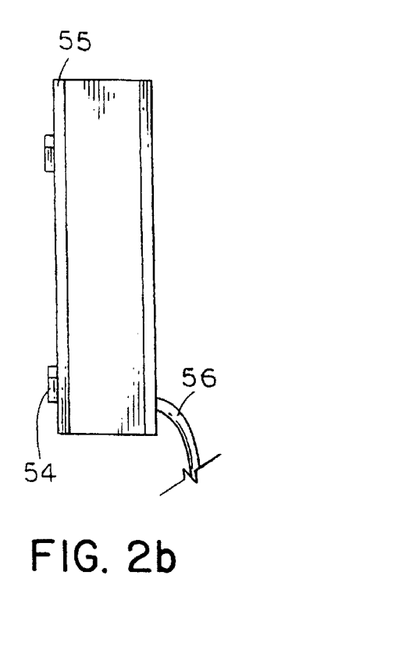
FIG. 2b shows a side view of the controller of the bioremediation system of the present invention.
Figure 2C:
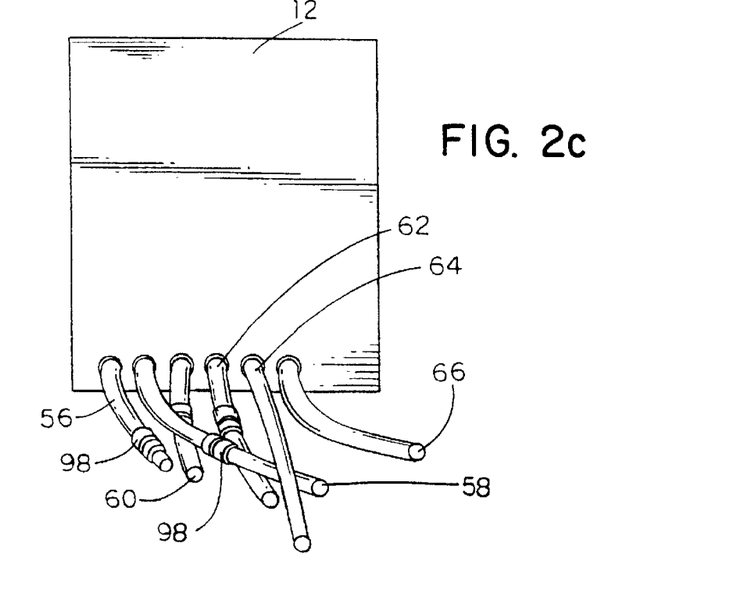
FIG. 2c shows a back view of the controller of the bioremediation system of the present invention.
Figure 5:
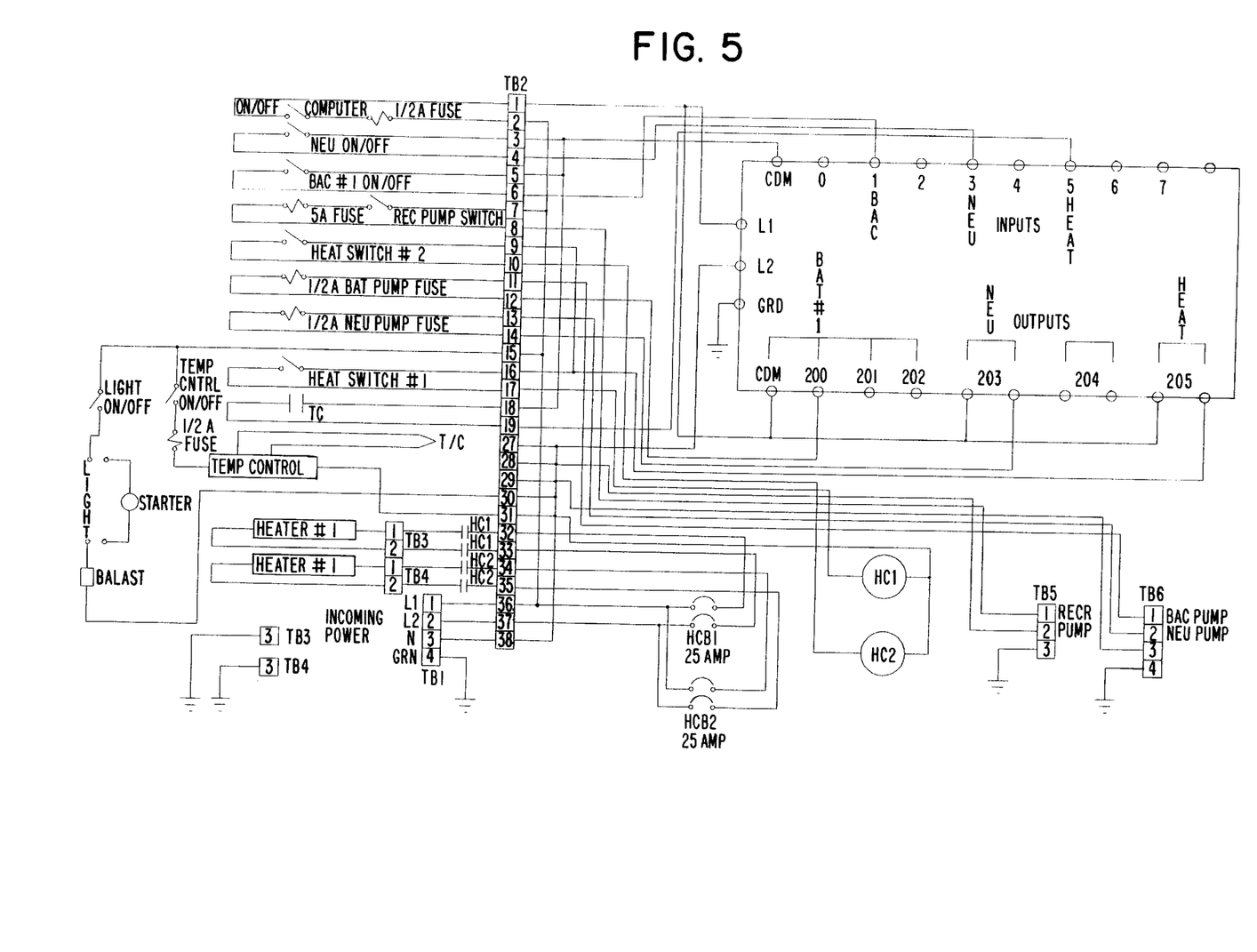
FIG. 5 shows a schematic of the circuitry of the controller of the bioremediation system of the present invention.

The controller (12) contains the computer, electrical circuitry and function controls to operate the bioremediation system (10). The computer in the controller (12) can be programmed so that the operation of the system can be customized for the type of waste site being treated, the microorganism being used, and the number of microorganisms required to treat the specific waste. A schematic of this circuitry is shown in FIG. 5. FIGS. 2a, 2b and 2c show the different elements of the controller (12) in detail. In the preferred embodiment, the controller (12) is rectangular or square in shape and contains a front panel (23) with a hinged locking panel cover (55). There is a rubber seal (not shown) located along the interior perimeter of the locking panel cover (55). This seal protects the internal parts of the controller (12) from environmental factors, such as moisture, and other factors that would adversely affect the functioning of the controller (12) in the field. The controller (12) is composed of a durable metal or plastic that can withstand environmental conditions at the treatment site. The front panel (23) of the controller contains the following elements; a panel light switch (24), a panel light (26), heater breaker #1 (28), heater breaker #2 (30), fuses (32), a temperature control switch (34), heater #1 control (36), heater #2 control (38), recirculation pump control switch (40), microorganism pump control (42), nutrients pump control (44), a temperature control (46), a computer (48), computer control (50) and an internal key lock (52). The locking panel cover (55) contains a pair of external key locks (54). Numerous power and control lines exit the back of the controller (12) as shown in FIG. 2c, and connect to the other components of the system (10) so that they function as programmed. These power and control lines are: the microorganism/nutrient supply pump power (56), the recirculation pump power (58), the heater #1 power (60), the heater #2 power (62), the main power (64), and the temperature probe wire (66).

Figure 3:
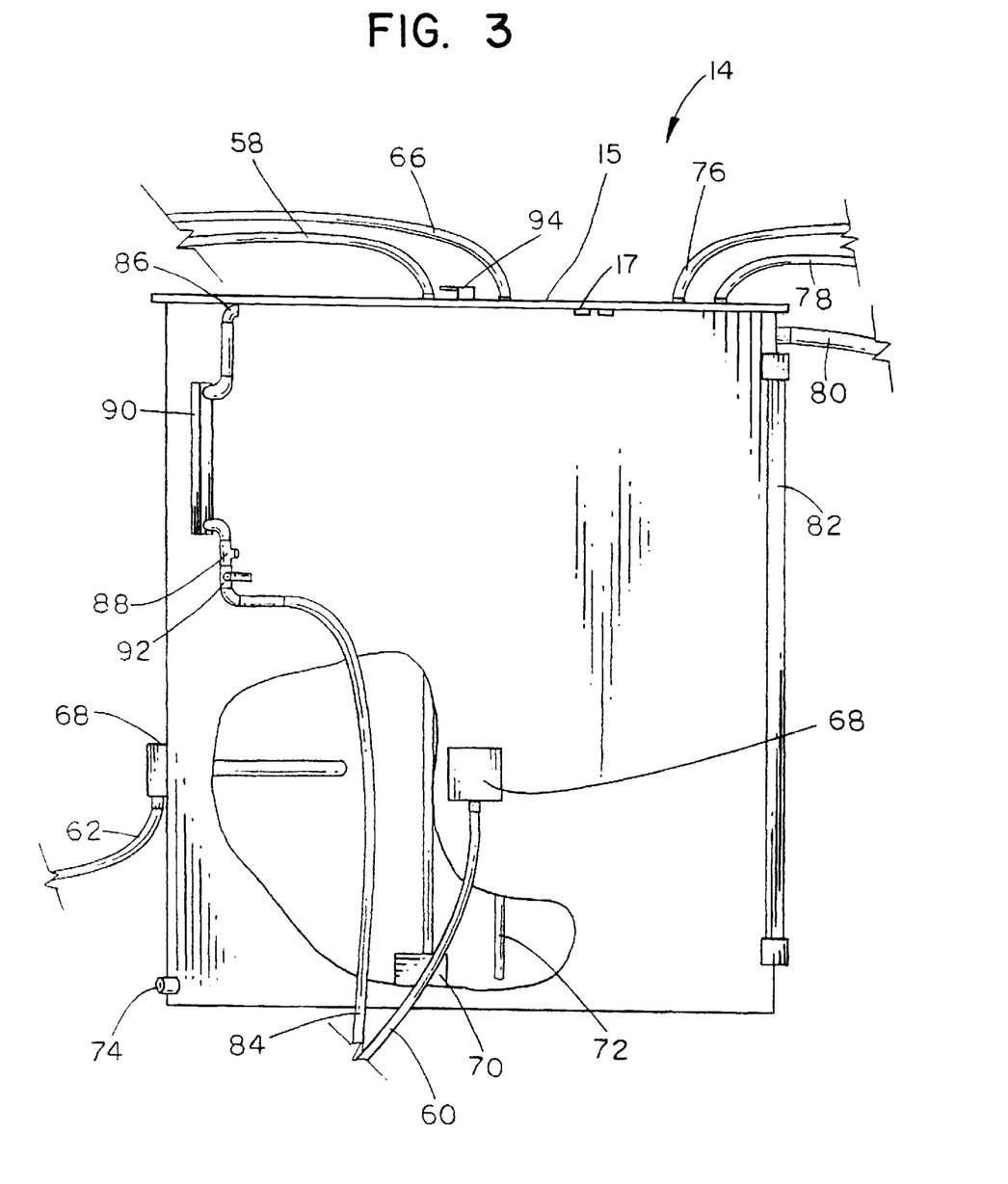
FIG. 3 shows a perspective and cutaway view of the culture vessel of the bioremediation system of the present invention.

The computer (48) can be programmed to control the amount of nutrients and/or microorganisms that are to be added to the culture vessel (14) from the nutrient containing (20) and microorganism containing (22) boxes. The addition of specific amounts of these liquids are preferably programmed to be added periodically or continuously. Additionally, the temperature control (46) regulates the temperature of the media in the culture vessel (14) by turning the heaters on and off in response to any differences between the preset temperature and the temperature measured by the temperature probe (72). The circulation of the microorganism containing media inside the culture vessel is accomplished by the recirculation pump (70), which is controlled by the recirculation pump control switch (40).

FIG. 3 shows the preferred culture vessel in detail. The culture vessel (14) can be any shaped container, however a barrel or drum shape is preferred. The culture vessel can be made of metal or plastic. The size of the barrel can vary depending upon the site to be treated, however a size of 55–250 gallons is preferred. The culture vessel can be insulated from external temperature if necessary, by spraying the vessel with insulation material or by placing it in a temperature controlled environment, such as a shelter or shed. The culture vessel (14) contains a protruding lip (not shown) around the perimeter of the vessel that permits a lid (15) to be placed on top of the culture vessel (14) and engages the lip snugly. The lid (15) is locked into place by tightening the bolt of a locking ring (17). The lid (15) when locked into place on the culture vessel (14) forms a closed system.

The culture vessel (14) contains the microorganisms in nutrient media that are grown until they reach a particular cell density and are logarithmically growing. The culture vessel (14) contains at least one heating means, such as heating elements (68) #1 and #2 located on the outside of culture vessel (14) and extending into the inside of the vessel. At least one recirculation pumping means, such as the recirculation pump (70), for agitating the microorganism containing media and the temperature probe (72) are located on the inside of the culture vessel (14).

The culture vessel (14) contains several inlets in the lid (15) to allow nutrient media and stock microorganisms to be added to the culture vessel (14) from the nutrient media (20) and stock microorganism (22) containers, respectively. The culture vessel (14) contains water input means (84), microorganism input means, also known as the microorganism in-line (76), nutrient input means, also known as the nutrient media in-line (78), and culture vessel output means or culture vessel out-line hose (80). These input and output means are each openings into the culture vessel to which a hose external to the culture vessel is attached, which allow the flow of water, nutrient media, and stock microorganisms into the culture vessel and the flow of the active, logarithmically growing microorganisms out of the culture vessel. These input and output hoses can be a pipe or tube made of rubber, polypropylene, copper or any other suitable flexible material. The culture vessel (14) also contains a clear volume gauge (82) for measuring the level of media in the culture vessel (14).

The on site bioremediation system also includes a water source connected to the water input means of the culture vessel. An water in-line hose (84) is connected to a clear water source that does not need to be sterile but sterile and/or deionized water may enhance the functioning of the system by reducing the possibility of contamination of the culture inside the vessel (14). Further, chlorinated water may reduce the numbers of microorganisms and therefore, it is preferred that non-chlorinated water be used. The in-line hose (84) connects to the water inlet valve (92) which is connected to the back flow preventer (88). The water then passes through the water inlet gauge (90) and then into the culture vessel (14) through the in water line (86) allowing the addition of water that functions as the media carrier to the culture vessel (14). The culture vessel (14) also contains a drain valve (74) that allows the draining and cleaning of the culture vessel (14) after use. The lid (15) of the culture vessel (14) contains an air bleed valve (94) for releasing air from the vessel (14). The air bleed valve (94) can also be used to inject air, oxygen, and carbon dioxide into the culture vessel (14).

Figure 4:
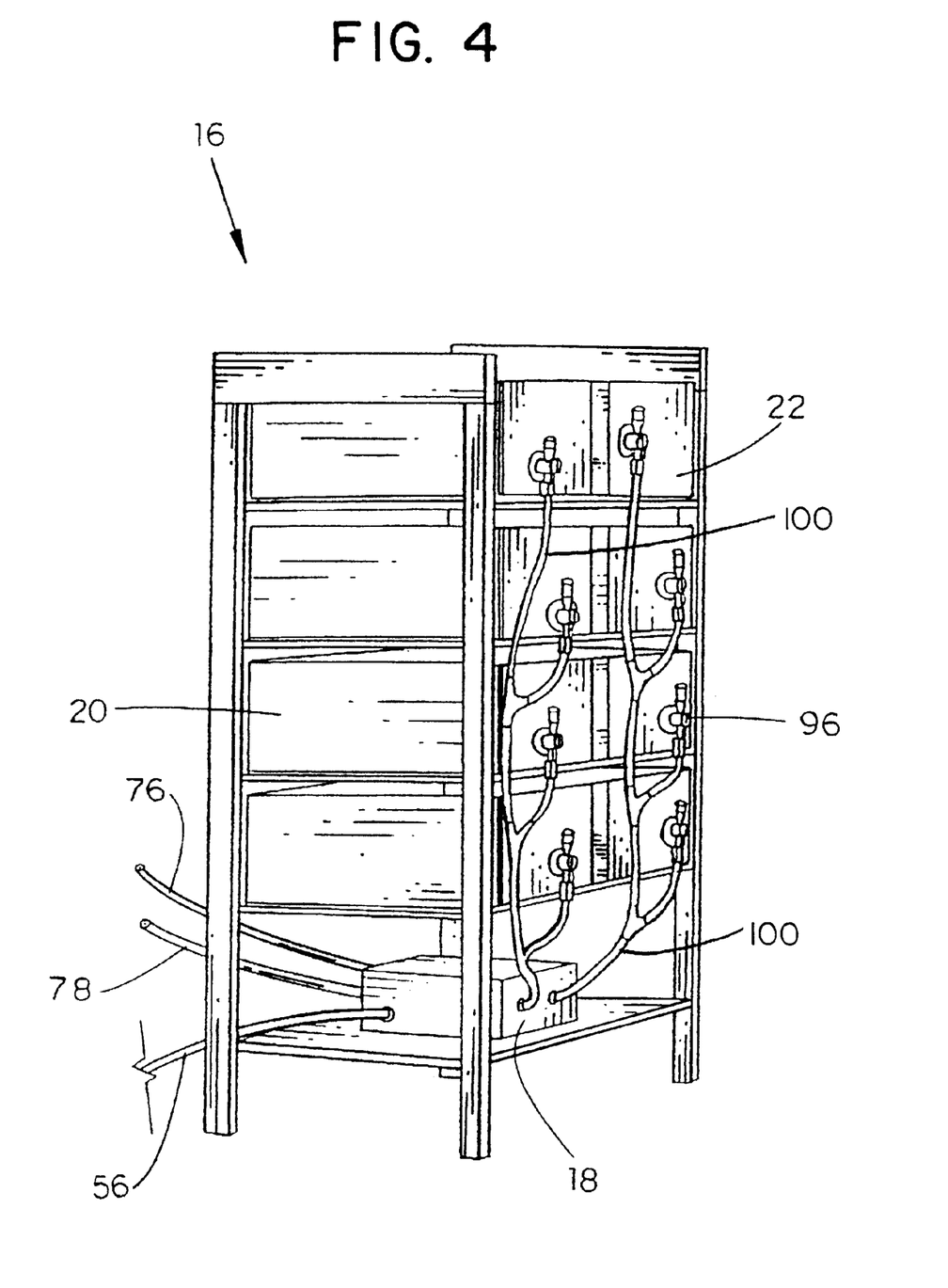
FIG. 4 shows a perspective view of the rack holding nutrient containing boxes, bacteria containing boxes and the nutrient/bacteria pump of the bioremediation system of the present invention.

FIG. 4 shows the rack (16) that holds the nutrient containing boxes (20) and the microorganism containing boxes (22) from which microorganism/nutrient boxes outlet valves (96) are attached. The microorganisms and nutrient medium flow by gravity out of the boxes (20) and (22) through the outlet valves (96) and microorganism/nutrient outlet lines (100) to the pump (18). When activated, the pump (18) pumps microorganisms and/or nutrients into the culture vessel (14) via the bacteria in-line (76) and the nutrient in-line (78), respectively. The microorganism/nutrient supply pump power (56) is connected to the control box (12). The boxes (20) and (22) can be any vessel capable of holding sterile liquid media; however, to enhance the portability of the system (10) for use on site, cardboard boxes containing plastic bags are preferred containers. These boxes are similar in design to the boxes containing syrup that is mixed with carbonated water to obtain a carbonated soda. The plastic bags must be capable of being sterilized so that the microorganisms and nutrient media can be placed in them and kept sterile until use.

The system (10) functions as an on site bioreactor to produce large numbers of active, live, logarithmically growing microorganisms for application to a biodegradable waste or contaminant that the microorganism can metabolize. The specific microorganisms that will be cultured in the system (10) will vary depending on the waste to be degraded as well as the culture requirements of each microorganism. Examples of useful microorganisms which can be cultured in the present bioremediation system are: *Bacillus methanicus* useful in reducing methane concentrations at a waste site, *Nocardia parnffinae* and *Mycobacterium paraffinicum* useful in reducing paraffin buildup or commercially available microbial blends for treatment of municipal wastewater, of petroleum, of foodstuff processing wastes, etc., such as those blends sold by LRC Technologies, LLC, 3350 Ridgelake Drive, Suite 180, Metairie, La. 70002.

To utilize the system (10), an appropriate microorganism is selected, and either used directly from a commercial source, such as the microorganisms commercially available as discussed above, or obtained as a lyophilized or stock culture, cultured and packaged under sterile conditions in boxes (22). Likewise, nutrient media in which the selected microorganism will grow is prepared and sterilized and packaged in boxes (20). A program for sustaining the specific microorganisms in the culture vessel is entered into the computer (48). The boxes (20) and (22) are placed in the rack (16).

The bioremediation system of the present invention is used to metabolize biodegradable waste at the site of the waste by preparing active, logarithmically growing microorganisms at the waste site by culturing the microorganisms under conditions sufficient to obtain active logarithmically growing microorganisms in the culture vessel (14) described in detail above. The microorganisms in the vessel are cultured until a sufficient number of active, logarithmically growing microorganisms to metabolize the biodegradable waste are obtained. During this time, nutrient media and stock microorganisms are added to the culture vessel periodically or continuously. The active, logarithmically growing microorganisms produced in the culture vessel are then applied to the biodegradable waste to metabolize the waste.

Prior to culturing the microorganisms, the culture vessel (14) is filled with water by opening the water inlet valve (92) so that the water runs into the culture vessel through in water line (86). When the level of water has reached a designated predetermined liquid level as read through the clear volume gauge (82), the water inlet valve (92) is closed. The water is heated to the appropriate temperature for culturing the selected microorganism by use of the temperature control (46). Once the water in the culture vessel (14) has reached the preselected temperature, an initial input of nutrient media and an initial inoculation of stock microorganisms is performed by the system operator. The operator programs the computer to add the initial nutrient media and microorganisms from boxes (20) and (22), respectively. When the initial "booting up" is performed in this manner, the lid (15) of the culture vessel does not need to be removed from the culture vessel (14). Alternatively, the operator removes the lid (15) and pours the stock microorganisms and nutrient media into the culture vessel (14), and then replaces the lid (15). When culturing aerobic microorganisms, oxygen can be pumped into the culture vessel through the air bleed valve (94) if the growth of the microorganisms would be enhanced by this addition. If anaerobic microorganisms are prepared, the operator may inoculate the culture vessel (14) using the same method as he did when initially inoculating the culture vessel (14) with aerobic microorganisms; however, carbon dioxide is then pumped into the culture vessel (14) through the air bleed valve (94) to remove the oxygen.

The system (10) is then allowed to operate for a length of time until the microorganisms have reached a sufficient cell density to treat the waste. During this culturing, predetermined amounts of both nutrient media and stock microorganisms are added to the culture vessel (14). This addition is controlled by the computer to deliver these predetermined amounts on a periodic or continuous basis during culturing. The number of microorganisms in the culture vessel (14) should reach at least approximately $1.5$–$3 \times 10^6$ cells/ml but this number will vary depending upon the microorganism used and the waste to be treated. Preliminary experiments to determine culturing times to reach particular cell densities will provide a time line which can be used in preprogramming and operating the system. After the appropriate cell density is reached for release into the waste, the water inlet valve (92) is opened to let water enter the culture vessel (14) through the water input means (84). The appropriate time to open the water inlet valve (92) would have been determined by previously running time trials to determine how long the cultivation must run to reach a specific number of microorganisms per ml. The number of microorganisms can also be determined by counting using well known techniques, such as plating. As the level of the liquid microbial containing media in the culture vessel (14) increases as a result of the incoming water, the media containing the active, logarithmically growing microorganisms then flows by gravity out of the culture vessel (14) through the culture vessel out-line (80) onto the waste to be treated.

In-flow of clear water into the culture vessel (14) is controlled manually by setting the rate on the water inlet valve (92) but this function could also be controlled by the computer. The flow rate of the microorganism containing media out of the culture vessel (14) is determined by the flow rate of water into the culture vessel. If water enters the culture vessel (14) continuously then the active, logarithmically growing microorganism containing media will flow out of the culture vessel (14) continuously. If the water flowing into the culture vessel (14) is stopped, then no microorganism containing media will flow out of the culture vessel (14). The computer (48) controls the specific amount of stock microorganisms and nutrient media from boxes (22) and (20), respectively that are periodically added to the heated water in the culture vessel (14). The recirculation pump (70) pumps the microorganism containing culture media from the bottom of the vessel (14) through a hose and directs a stream of the media against a wall of the vessel resulting in a double recirculation of the culture medium. If the microorganism is aerobic, then oxygen can be added through the air bleed valve (94) on the lid (15) of the vessel (14). If the microorganism is anaerobic, then carbon dioxide can be added through the air bleed valve (94). The programmed computer (48) continues to control the addition of microorganisms and nutrient medium on a periodic or continuous basis, and the culture medium continues to flow out of the culture vessel (14) to the site onto the waste until the waste has been metabolized. The period of time that the site is treated is determined by the operator. It may be necessary to treat some sites for months or if the contamination is continuous, then the site may need to be treated continuously. It is also possible that sites will need to be treated periodically at regular intervals. The treatment of the waste is dependent upon the microorganisms used and the waste to be treated. The present versatile bioremediation system (10) allows the operator to customize the system for treatment of a specific waste.

EXAMPLE

The claimed bioremediation system was used to prepare a culture of active, logarithmically growing microorganisms to treat wastewater from a lift station of a large metropolitan waste treatment facility using the method as described above.

Microbial Blend LRC-2 designated for treatment of wastewater purchased from LRC Technologies, LLC was used to prepare the stock microorganisms. Two oz. of LRC-2 was diluted into 5 gallons of water to make the stock solution that is placed in the stock microorganism containers. The nutrient media was composed of 13 grams of phosphoric acid and 600 grams of ammonium nitrate dissolved in 5 gallons of water. This nutrient media was placed in the nutrient media containers.

A 110 gallon culture vessel was filled with water and heated to 98° F. When this temperature was reached, the culture vessel (vessel #1) was "booted up" by adding 16 oz. of the stock microorganisms and 40 oz. of the nutrient media to the heated water. Four oz. of stock microorganisms and 10 oz. of nutrient media were added to this culture vessel every 20 minutes. A control 110 gallon culture vessel (vessel #2) was also filled with water and heated to 98° F. but no stock microorganisms or nutrient media was added to this vessel. After 12 hours of culturing the microorganisms in culture vessel #1, and using the same culture conditions on the control vessel #2, water was allowed to flow into the both culture vessels at the rate of 12 gallons per hour. This inflow of water resulted in 12 gallons of the contents of each culture vessel to flow out of culture vessel into separate treatment tubs containing wastewater. Treatment of the waste water continued for approximately three weeks with the microorganisms in the culture vessel #1 continuing to actively grow. The treated wastewater was tested using the following parameters: plate count, pH, biological oxygen demand (BOD), total settleable solids (TSS), and oils and grease (FOG). The results of the testing showed that the microbial treated wastewater had reduced BOD, TSS, and FOG over time and as compared to the results obtained with the liquid flowing out of vessel #2. As the test continued, and the pH stayed at approximately 7 throughout the treatment in vessel #1. Reduction in these above parameters show that the active, logarithmically growing microorganisms of the present invention are capable of reducing the levels of major indicators of contamination and pollution in wastewater. The use of control vessel #2 allowed an identical volume of wastewater to be subjected to all conditions in the treatment tub except the addition of the microorganisms.

While, the foregoing embodiments of the present invention have been set forth in considerable detail for the purposes of making a complete disclosure of the invention, it may be apparent to those of skill in the art that numerous changes may be made without departing from the spirit and principles of the invention.

We claim:
1. An on site bioremediation system comprising:
   at least one single chambered culture vessel consisting essentially of:
      water input means;
      microorganism input means;
      nutrient input means;
      culture vessel output means for output of logarithmically growing microorganisms that is not connected to another culture vessel; and
      a removable, sealable lid with an air bleed valve;
   at least one container of nutrient media located external to said culture vessel and connected to said nutrient input means;
   at least one container of stock microorganisms located external to said culture vessel and connected to said microorganism input means; and
   a controller located external to said culture vessel comprising a computer programmed to control the operation of said culture vessel, said container of nutrient media, and said container of stock microorganisms,
   wherein said system continuously provides active, logarithmically growing microorganisms from said culture vessel output means to biodegradable waste at a site external to said system to metabolize said waste.

2. The on site bioremediation system according to claim 1, wherein said water input means, said microorganism input means; said nutrient input means; and said culture vessel output means are each openings into said culture vessel to which a hose external to said culture vessel is attached.

3. The on site bioremediation system according to claim 1, further comprising a water source connected to said water input means of said culture vessel.

4. The on site bioremediation system according to claim 1, wherein said culture vessel further consists essentially of at least one heating means and at least one recirculation pumping means.

5. The on site bioremediation system according to claim 1, further comprising a plurality of containers of nutrient media and a plurality of containers of stock microorganisms, wherein each container is located external to said culture vessel.

6. The on site bioremediation system according to claim 5, wherein said nutrient media and said stock microorganisms are contained in plastic bags located within the containers.

7. The on site bioremediation system according to claim 1, wherein said computer controls the periodic or continuous addition of said stock microorganisms and said nutrient media into said culture vessel.

8. A continuous method of metabolizing biodegradable waste with an on site bioremediation system at a site external to said system, wherein said method comprises:
continuously preparing active, logarithmically growing microorganisms at the site of said biodegradable waste external to said system by continuously culturing said microorganisms under conditions sufficient to obtain active, logarithmically growing microorganisms in an on site bioremediation system, wherein said system comprises:
at least on single chambered culture vessel consisting essentially of:
water input means;
micoroorganism input means;
nutrient input means;
culture vessel output means for output of logarithmically growing microorganisms that is not connected to another culture vessel; and
a removal, sealable lid with an air bleed valve;
at least one container of nutrient media located external to said culture vessel and connected to said nutrient unput means;
at least one container of stock microorganisms located external to said culture dvessel and connected to said microorganism input means; and
a controller located external to said culture vessel comprising a computer programmed to control the operation of said culture vessel, said container of nutrient media, and said container of stock microorganism,
wherein said culturing in said culture vessel continuously provides active, logarithmically growing microorganimsms from said culture vessel output means to metalbolize said biodegradable waste, and further wherein said nutrient media and said stock microorganisms are added to the culture vessel periodically or continuoulsy during said culturing; and
continuously applying said active, logarithmically growing microorganisms from said culture vessel output means to said biodegradable waste at a site external to said system to metabolize said waste.

9. The method according to claim 8, wherein said water input means, said microorganism input means, said nutrient input means, and said culture vessel output means of said culture vessel are each openings into said culture vessel to which a hose external to said culture vessel is attached.

10. The method according to claim 8 wherein said bioremediation system further comprises a water source connected to said water input means of said culture vessel.

11. The method according to claim 8, wherein said culture vessel further comprises essentially of at least one heating means and at least one recirculation pumping means.

12. The method according to claim 8, wherein said bioremediation system further comprises a plurality of containers of nutrient media and a plurality of containers of stock microorganisms, wherein each container is located external to said culture vessel.

13. The method according to claim 12, wherein said nutrient media and said stock microorganisms are contained in plastic bags located within the containers.

14. The method according to claim 8, wherein said preparation of said logarithmically growing microorganisms further comprises adding water to said culture vessel to a predetermined level, heating said water to a preprogrammed temperature, and then adding said nutrient media and said stock microorganisms to said heated water prior to culturing said stock microorganisms.

15. The method according to claim 8, wherein said addition of said nutrient media and said stock microorganisms to said culture vessel is computer controlled to deliver a predetermined amount of said nutrient media and stock microorganisms over a period of time.

16. The method according to claim 8, wherein said continuous application of said logarithimically growing microorganisms to said waste comprises adding water to said culture vessel until said active, logarithmically growing microorganisms flow from said culture vessel through said culture vessel output means into said biodegradable waste.

17. The method according to claim 16, wherein said flow of said active, logarithmically growing microorganisms from said culture vessel occurs at the same rate as the rate of the addition of said water to said culture vessel.

18. The method according to claim 8, wherein said biodegradable waste is sewage, wastewater, grease, fats, petroleum based products or by-products or garbage.

19. The on site bioremediation system according to claim 1, further comprising at least two of said single chambered culture vessels set up individually.

20. The method according to claim, whrerein said bioremediation system further comprises at least two of said single chambered culture vessels set up individually, wherein said active, logarithmically growing microorganisms from each of said culture vessels from said output means are continuously applied to said biodegradable waste.

* * * * *

UNITED STATES PATENT AND TRADEMARK OFFICE
CERTIFICATE OF CORRECTION

PATENT NO. : 6,087,155
DATED : July 11, 2000
INVENTOR(S) : Billy G YORK et al.

It is certified that error appears in the above-identified patent and that said Letters Patent is hereby corrected as shown below:

Column 9, line 59: delete "metalbolize" and insert --metabolize--;

Column 10, line 16: delete "comprises" and insert --consists--;

Column 10, line 53: after "claim" insert --8--.

Signed and Sealed this

Twenty-second Day of May, 2001

*Attest:*

NICHOLAS P. GODICI

*Attesting Officer*     Acting Director of the United States Patent and Trademark Office